(12) United States Patent
Kotake et al.

(10) Patent No.: US 8,223,146 B2
(45) Date of Patent: Jul. 17, 2012

(54) IMAGE PROCESSING APPARATUS AND IMAGE PROCESSING METHOD

(75) Inventors: Daisuke Kotake, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 12/418,082

(22) Filed: Apr. 3, 2009

(65) Prior Publication Data

US 2009/0262113 A1    Oct. 22, 2009

(30) Foreign Application Priority Data

Apr. 9, 2008  (JP) ................................. 2008-101814

(51) Int. Cl.
*G06T 17/00* (2006.01)
(52) U.S. Cl. ........................................ 345/420; 715/757
(58) Field of Classification Search ................. 345/420; 715/757
See application file for complete search history.

(56) References Cited

U.S. PATENT DOCUMENTS

| | | | |
|---|---|---|---|
| 6,792,370 B2 | 9/2004 | Satoh et al. ...................... 702/95 |
| 6,993,450 B2 | 1/2006 | Takemoto et al. ............. 702/153 |
| 7,092,109 B2 | 8/2006 | Satoh et al. .................... 356/620 |
| 7,130,754 B2 | 10/2006 | Satoh et al. ...................... 702/95 |
| 7,411,594 B2 | 8/2008 | Endo et al. ..................... 345/633 |
| 2005/0116964 A1 | 6/2005 | Kotake et al. .................. 345/629 |
| 2007/0091125 A1 | 4/2007 | Takemoto et al. ............ 345/633 |
| 2007/0092161 A1 | 4/2007 | Aratani et al. ................. 382/286 |
| 2007/0242899 A1 | 10/2007 | Satoh et al. .................... 382/286 |
| 2008/0284864 A1 | 11/2008 | Kotake et al. | |
| 2009/0009522 A1 | 1/2009 | Endo et al. ..................... 345/474 |

FOREIGN PATENT DOCUMENTS

JP    2008-046750 A    2/2008

OTHER PUBLICATIONS

Kotake et al. "A Fast Initialization Method for Edge-based Registration Using an Inclination Constraint," 2007 IEEE, pp. 1, 3, 5.*
Pupilli et al. "Real-Time Camera Tracking Using Known 3D Models and a Particle Filter," Department of Computer Science, University of Bristol, United Kingdom, 2006 IEEE, p. 2.*
M. Isard and A. Blake, "Condensation—conditional density propagation for visual tracking," International Journal of Computer Vision, vol. 29, No. 1, pp. 5-28, 1998.

(Continued)

*Primary Examiner* — Maurice L McDowell, Jr.
(74) *Attorney, Agent, or Firm* — Fitzpatrick, Cella, Harper & Scinto

(57) ABSTRACT

A unit (110) acquires an image, sensed by an image sensing device (100), of a physical object having an outer appearance that can be expressed by line segments. A unit (120) stores defining data used to classify line segments configuring a 3D virtual object that simulates the outer appearance of the physical object into a plurality of groups and to define respective line segments belonging to the groups. A unit (130) selects one group from the groups one by one without any repetition. The unit (130) projects line segments which belong to the selected group onto a physical space using the defining data used to define that line segments, and the image of the physical space. The unit (130) then updates a position and orientation of the image sensing unit based on the line segments projected onto the physical space and a feature in the image of the physical object.

11 Claims, 10 Drawing Sheets

OTHER PUBLICATIONS

Kato, M. Billinghurst, Asano, and Tachibana, "An Augmented Reality System and its Calibration based on Marker Tracking", The Transactions of VRSJ, vol. 4, No. 4, pp. 607-617, 1999.

G. Simon, A.W. Fitzgibbon, and A. Zisserman, "Markerless tracking using planar structures in the scene," Proc. The 1st IEEE/ACM International Symposium on Augmented Reality (ISAR2000), pp. 120-128, 2000.

T. Drummond and R. Cipolla, "Real-time visual tracking of complex structures," IEEE Transactions on Pattern Analysis and Machine Intelligence, vol. 24, No. 7, pp. 932-946, 2002.

A.I. Comport, E. Marchand, and F. Chaumette, "A real-time tracker for markerless augmented reality," Proc. The 2nd IEEE/ACM International Symposium on Mixed and Augmented Reality (ISMAR03), pp. 36-45, 2003.

K. Satoh, S. Uchiyama, H. Yamamoto, and H. Tamura, "Robust vision-based registration utilizing bird's-eye view with user's view," Proc. The Second Int'l Symp. on Mixed and Augmented Reality (ISMAR03), pp. 46-55, 2003.

I. Skrypnyk and D.G. Lowe, "Scene modeling, recognition and tracking with invariant image features," Proc. The 3rd IEEE/ACM International Symposium on Mixed and Augmented Reality (ISMAR04), pp. 110-119, 2004.

L. Vacchetti, V. Lepetit, and P. Fua, "Combining edge and texture information for real-time accurate 3D camera tracking," Proc. The 3rd IEEE/ACM International Symposium on Mixed and Augmented Reality (ISMAR04), pp. 48-57, 2004.

M. Pupilli and A. Calway, "Real-time camera tracking using a particle filter," Proc. The 16th British Machine Vision Conference 2005 (BMVC2005), pp. 519-528, 2005.

H. Wuest, F. Vial, and D. Stricker, "Adaptive line tracking with multiple hypotheses for augmented reality," Proc. The Fourth Int'l Symp. on Mixed and Augmented Reality (ISMAR05), pp. 62-69, 2005.

Japanese Office Action, dated Jan. 10, 2012 in counterpart Japanese Patent Application No. 2008-101814.

D. Kotake et al., "A Fast Initialization Method for Edge-based Registration Using an Inclination Constraint", 6th IEEE and ACM International Symposium on Mixed and Augmented Reality, 2007, USA, IEE, ACM (Nov. 13, 2007), pp. 239-248.

M. Pupilli et al., "Real-Time Camera Tracking Using Known 3D Models and a Particle Filter", 18th International Conference on Pattern Recognition, IEEE, (Aug. 20, 2006), pp. 1-4.

* cited by examiner

| VER-TEX | X | Y | Z |
|---|---|---|---|
| P1 | 0 | 200 | 0 |
| P2 | 0 | 200 | 250 |
| P3 | 250 | 200 | 250 |
| P4 | 250 | 200 | 0 |
| P5 | 0 | 0 | 0 |
| P6 | 0 | 0 | 250 |
| P7 | 250 | 0 | 250 |
| P8 | 250 | 0 | 0 |
| P9 | 100 | 200 | 250 |
| P10 | 100 | 200 | 0 |
| P11 | 100 | 0 | 0 |

| PLANE | VERTICES THAT CONFIGURE PLANE AND ORDER |
|---|---|
| F1 | P1-P2-P3-P4 |
| F2 | P1-P4-P8-P5 |
| F3 | P1-P2-P6-P5 |
| F4 | P5-P6-P7-P8 |
| F5 | P2-P3-P7-P6 |
| F6 | P3-P4-P8-P7 |

| LINE SEG-MENT | 2 POINTS AT TWO ENDS | STRUCTURE DEFINING LEVEL |
|---|---|---|
| L1 | P1-P2 | 0 |
| L2 | P2-P3 | 0 |
| L3 | P3-P4 | 0 |
| L4 | P4-P1 | 0 |
| L5 | P5-P6 | 0 |
| L6 | P6-P7 | 0 |
| L7 | P7-P8 | 0 |
| L8 | P8-P5 | 0 |
| L9 | P1-P5 | 0 |
| L10 | P2-P6 | 0 |
| L11 | P3-P7 | 0 |
| L12 | P4-P8 | 0 |
| L13 | P9-P10 | 1 |
| L14 | P10-P11 | 1 |

● DIVIDED POINT

F I G. 12
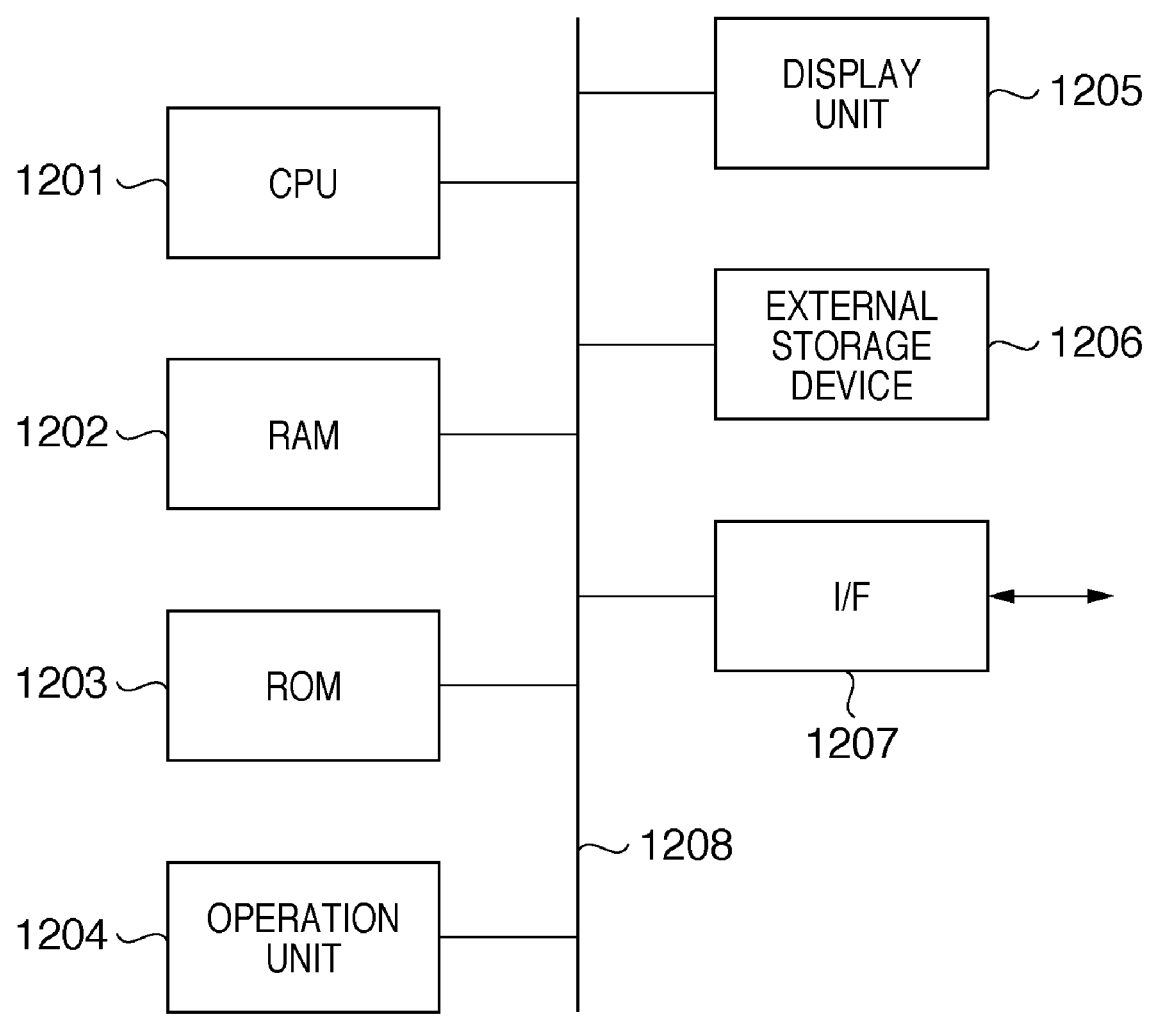

IMAGE PROCESSING APPARATUS AND IMAGE PROCESSING METHOD

BACKGROUND OF THE INVENTION

1. Field of the Invention

The present invention relates to a technique for calculating position and orientation information of a viewpoint of an image using the image.

2. Description of the Related Art

In recent years, the studies of information presentation techniques called Mixed Reality techniques (to be referred to as MR techniques hereinafter) have been extensively made. Of the MR techniques, the studies of an Augmented Reality technique (to be referred to as an AR technique hereinafter) which superimposes and displays information of a virtual space on a physical space have been especially extensively made. As a typical information presentation apparatus based on the AR technique, a video see-through Head Mounted Display (to be abbreviated as HMD hereinafter) is known. The video see-through HMD incorporates a camera for sensing an image of the physical space. On the image of the physical space sensed by this camera, a virtual object, which is generated by computer graphics (to be abbreviated as CG hereinafter) in accordance with the position and orientation of the camera, is superimposed and rendered, and is displayed on a display device such as a liquid crystal panel of the HMD. With the AR technique, the user can feel as if the virtual object were actually existing on the physical space.

As one serious problem to be solved upon implementation of the AR technique, a registration problem is known. In order to make the user feel as if a virtual object actually existed on the physical space, geometrical consistency has to be ensured between the virtual object and physical space. That is, the virtual object has to always be observed from the user so as to exist at a position where it should exist on the physical space.

In the AR using the video see-through HMD, every time an image is input from the camera incorporated in the HMD, the position and orientation of the camera upon sensing that image on the physical space are measured. Then, processing for rendering a CG based on these position and orientation of the camera, and specific parameters of the camera such as a focal length, and superimposing that CG on the image of the physical space is generally executed. For this reason, in case of the AR using the video see-through HMD, the registration problem is that posed upon measuring the position and orientation of the camera incorporated in the HMD on the physical space. The position and orientation of the camera can be measured by a six-degrees-of-freedom physical sensor that measures the position and orientation of the camera such as a magnetic sensor, ultrasonic sensor, or optical sensor.

When the video see-through HMD is used, image information from the camera incorporated in the video see-through HMD can be used for registration. The registration method using image information is popularly used since it requires simpler processes and lower cost than the method using the physical sensor. In the registration method using image information, it is a common practice to sense, using the camera, an image of an index which has a given three-dimensional (3D) position on the physical space, and to calculate the position and orientation of the camera based on correspondence between the position of the index on the sensed image and its 3D position. As the index, markers which are artificially laid out on the physical space or natural features such as corner points and edges which originally exist on the physical space may be used. In practice, artificial markers which are easily detected and identified from an image are prevalently used since they require a light calculation load and are suited to real-time processing.

Non-patent reference 1 discloses a registration method using a marker having a square shape (square marker) including a unique two-dimensional (2D) pattern as an index. With this method, a region of the square marker is extracted from an image, and the square marker is identified using the inner 2D pattern. Furthermore, the position and orientation of the camera are calculated based on correspondence between the positions of vertices of the square marker on an image sensed by the camera, and those of the vertices of the square marker on a marker coordinate system.

An artificial marker such as the square marker is widely used since it can be readily used. However, such artificial marker cannot be used when it is physically impossible to lay out the marker or when the marker does not want to be laid out for the reason for spoiling the beauty.

Along with the recent improvement of computer performance, the studies of a registration method using natural features have been extensively made. As natural features used in registration, a point feature such as a corner point and a line feature such as an edge are mainly used.

Non-patent reference 2 discloses a method which sequentially estimates the position and orientation of the camera by detecting point features from an image by a Harris detector, and tracking the point features which exist on a single plane on the physical space between images. Non-patent reference 3 uses point features called SIFT (Scale Invariant Feature Transform) features, which are rotation invariant, scale invariant, and has high identifiability. That is, a database of the 3D positions of SIFT features on the physical space is generated in advance, and point features are identified by matching between SIFT features detected from an image sensed by the camera, and those on the database, thus calculating the position and orientation of the camera.

In general, a point feature has an advantage of high identifiability since it is expressed by information of a feature position and its surrounding pixels. However, the point feature has low detection precision and poor registration precision, since its appearance changes largely depending on the observation direction. Since the calculation load of image processing for feature detection (for example, template matching or detection of SIFT features) is heavy, some ingenuity is required to attain real-time processing.

As a registration method that uses natural features and allows real-time processing, many studies about registration using edges (to be referred to as edge-based registration hereinafter) have been made (for example, see non-patent references 4, 5, and 6). Unlike a point feature, since an edge is invariant for a scale and observation direction, the edge-based registration has a feature of high registration precision. The edge-based registration method described in each of non-patent references 4, 5, and 6 is premised on having 3D model data of the physical space and a physical object. Each 3D model data is described by a set of line segments. The registration using an edge is generally implemented by (process 1) to (process 3) as follows.

(Process 1) The aforementioned 3D model data (line segment models) are projected onto an image based on the predicted values of the position and orientation of the camera (for example, the position and orientation of the camera in a previous frame) and calibrated specific parameters of the camera.

(Process 2) Each of the projected line segments is divided at given intervals on the image. An edge search is conducted for respective divided points in the normal direction to each line segment. Normally, a point with a maximal luminance value gradient on a search line is detected as an edge.

(Process 3) The position and orientation of the camera are repetitively corrected by a nonlinear optimization calculation to minimize the sum total of distances on the image between the edges detected for respective divided points and the projected line segments.

Unlike a point feature, an edge has low identifiability on an image. In the edge search, since only information indicating a maximal luminance value gradient on a search line is used, a wrong edge is often detected. Non-patent references 4 and 5 use a method called M-estimation to prevent erroneously detected edges from adversely influencing optimization calculations, and make the optimization calculations to set small weights for edge data which are estimated as erroneously detected edges.

In non-patent reference 5, upon conducting the edge search in the normal direction of each projected line segment, pixel values are convoluted using a kernel that allows to strongly detect an edge having the same direction as the projected line segment, thereby preventing detection of an edge having a different direction. Furthermore, the calculation results of the convolution calculations are used as weights in the optimization calculations, and a large weight is assigned to data of an edge having a direction similar to the projected line segment, thus reducing the influence of erroneously detected edges.

Furthermore, in non-patent reference 6, upon conducting the edge search in the normal direction of each projected line segment, a plurality of edges are detected in place of one edge, and are held as candidates. In the optimization calculations, a candidate edge closest to the projected line segment is used in respective steps of repetition, thus reducing the influence of detection errors.

[Non-Patent Reference 1]

Kato, M. Billinghurst, Asano, and Tachibana, "An Augmented Reality System and its Calibration based on Marker Tracking", The Transactions of VRSJ, vol. 4, no. 4, pp. 607-617, 1999.

[Non-Patent Reference 2]

G. Simon, A. W. Fitzgibbon, and A. Zisserman, "Markerless tracking using planar structures in the scene," Proc. The 1st IEEE/ACM International Symposium on Augmented Reality (ISAR2000), pp. 120-128, 2000.

[Non-Patent Reference 3]

I. Skrypnyk and D. G. Lowe, "Scene modeling, recognition and tracking with invariant image features," Proc. The 3rd IEEE/ACM International Symposium on Mixed and Augmented Reality (ISMAR04), pp. 110-119, 2004.

[Non-Patent Reference 4]

T. Drummond and R. Cipolla, "Real-time visual tracking of complex structures," IEEE Transactions on Pattern Analysis and Machine Intelligence, vol. 24, no. 7, pp. 932-946, 2002.

[Non-Patent Reference 5]

A. I. Comport, E. Marchand, and F. Chaumette, "A real-time tracker for markerless augmented reality," Proc. The 2nd IEEE/ACM International Symposium on Mixed and Augmented Reality (ISMAR03), pp. 36-45, 2003.

[Non-Patent Reference 6]

L. Vacchetti, V. Lepetit, and P. Fua, "Combining edge and texture information for real-time accurate 3D camera tracking," Proc. The 3rd IEEE/ACM International Symposium on Mixed and Augmented Reality (ISMAR04), pp. 48-57, 2004.

[Non-Patent Reference 7]

H. Wuest, F. Vial, and D. Stricker, "Adaptive line tracking with multiple hypotheses for augmented reality," Proc. The Fourth Int'l Symp. on Mixed and Augmented Reality (ISMAR05), pp. 62-69, 2005.

[Non-Patent Reference 8]

K. Satoh, S. Uchiyama, H. Yamamoto, and H. Tamura, "Robust vision-based registration utilizing bird's-eye view with user's view," Proc. The Second Int'l Symp. on Mixed and Augmented Reality (ISMAR03), pp. 46-55, 2003.

[Non-Patent Reference 9]

M. Isard and A. Blake, "CONDENSATION—conditional density propagation for visual tracking," International Journal of Computer Vision, vol. 29, no. 1, pp. 5-28, 1998.

[Non-Patent Reference 10]

M. Pupilli and A. Calway, "Real-time camera tracking using a particle filter," Proc. The 16th British Machine Vision Conference 2005 (BMVC2005), pp. 519-528, 2005.

In the conventional edge-based registration method, in order to solve the problem about detection errors of edges, weights are given to data for respective line segment divided points in accordance with the distances between the edge detection positions and projected line segments using the M-estimation to attain nonlinear optimization, thus eliminating the influence of detection errors.

However, when, for example, an object having a repetitive pattern (a shelf, window, or the like) exists on the physical space, and a 3D model of this object is used in edge-based registration, and when a repetitive pattern part largely occupies the field of view, the aforementioned method poses a problem. Because, in such case, since line segments that match the repetitive pattern have a majority, even when edges corresponding to the repetitive pattern are erroneously detected, they are not determined as detection errors. For this reason, even when the aforementioned M-estimation is used, the obtained position and orientation of the camera are not optimal solutions although they are local minimal solutions, thus lowering registration precision.

SUMMARY OF THE INVENTION

The present invention has been made in consideration of the aforementioned problems, and provides a technique for improving registration precision for an object having a repetitive pattern or similar line segments.

According to the first aspect of the present invention, an image processing apparatus comprises: a storage unit configured to store defining data used to classify line segments which configure a virtual object corresponding to a physical object into a plurality of groups and to define each of the line segments; an image sensing unit configured to sense an image of the physical object; a selection unit configured to select one group from the plurality of groups one by one without any duplication; a projection unit configured to project line segments which belong to the group selected by the selection unit onto a physical space using the defining data used to define that line segments, and the image of the physical object; and an updating unit configured to update position and orientation information indicating a position and orientation of the image sensing unit based on the line segments projected onto the physical space and a feature in the image of the physical object.

According to the second aspect of the present invention, an image processing apparatus comprises: a storage unit configured to store defining data used to classify line segments which configure a virtual object corresponding to a physical object into a plurality of groups and to define each of the line segments; an image sensing unit configured to sense an image of the physical object; a unit configured to generate a plurality of types of position and orientation information; a unit configured to randomly change each of the plurality of types of position and orientation information; a selection unit configured to select one group from the plurality of groups one by one without any duplication; every time the selection unit selects one group, a unit configured to execute, for each position and orientation information, a process for projecting line segments which belong to the selected group onto the image based on the defining data used to define the line segments which belong to the selected group and the randomly changed position and orientation information; a unit configured to calculate a weight value for each position and orientation information based on correspondence between edges detected from the image and the projected line segments; and a calculation unit configured to calculate a position and orientation of a viewpoint of the image based on the respective pieces of position and orientation information and the weight values for the respective pieces of position and orientation information.

According to the third aspect of the present invention, an image processing method comprises: a storage step of storing defining data used to classify line segments which configure a virtual object corresponding to a physical object into a plurality of groups and to define each of the line segments; an image sensing step of sensing an image of the physical object using an image sensing unit; a selection step of selecting one group from the plurality of groups one by one without any duplication; a projection step of projecting line segments which belong to the group selected in the selection step onto a physical space using the defining data used to define that line segments, and the image of the physical object; and an updating step of updating position and orientation information indicating a position and orientation of the image sensing unit based on the line segments projected onto the physical space and a feature in the image of the physical object.

According to the fourth aspect of the present invention, an image processing method comprises: a storage step of storing defining data used to classify line segments which configure a virtual object corresponding to a physical object into a plurality of groups and to define each of the line segments; an image sensing step of sensing an image of the physical object using an image sensing unit; a step of generating a plurality of types of position and orientation information; a step of randomly changing each of the plurality of types of position and orientation information; a selection step of selecting one group from the plurality of groups one by one without any duplication; every time one group is selected in the selection step, a step of executing, for each position and orientation information, a process for projecting line segments which belong to the selected group onto the image based on the defining data used to define the line segments which belong to the selected group and the randomly changed position and orientation information; a step of calculating a weight value for each position and orientation information based on correspondence between edges detected from the image and the projected line segments; and a calculation step of calculating a position and orientation of a viewpoint of the image based on the respective pieces of position and orientation information and the weight values for the respective pieces of position and orientation information.

Further features of the present invention will become apparent from the following description of exemplary embodiments with reference to the attached drawings.

BRIEF DESCRIPTION OF THE DRAWINGS

FIG. 12 is a block diagram showing an example of the hardware arrangement of a computer which is applicable to the position and orientation measurement apparatus 1.

DESCRIPTION OF THE EMBODIMENTS

Preferred embodiments of the present invention will be described in detail hereinafter with reference to the accompanying drawings. Note that these embodiments will be described as examples of the preferred arrangement of the invention described in the scope of the claims, and the invention is not limited to the embodiments to be described hereinafter.

[First Embodiment]

This embodiment will explain a system for calculating the position and orientation information of a viewpoint of an image on a physical space using a nonlinear optimization method.

Figure 1:
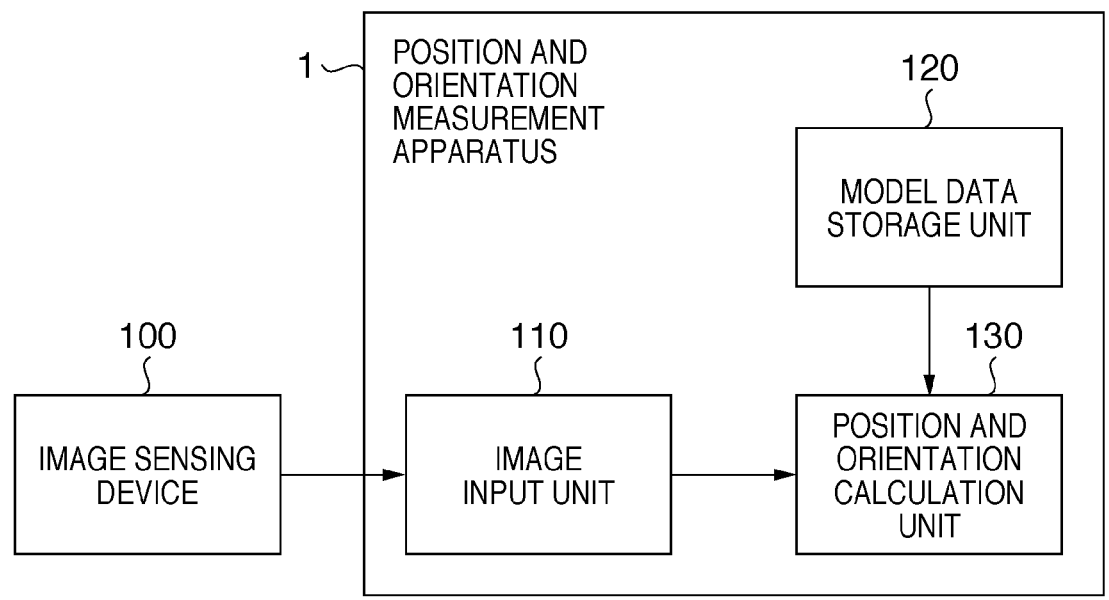
FIG. 1 is a block diagram showing an example of the functional arrangement of a system according to the first embodiment of the present invention.

FIG. 1 is a block diagram showing an example of the functional arrangement of a system according to this embodiment. As shown in FIG. 1, the system according to this embodiment includes an image sensing device 100 and position and orientation measurement apparatus (image processing apparatus) 1. As shown in FIG. 1, the position and orientation measurement apparatus 1 has an image input unit 110, model data storage unit 120, and position and orientation calculation unit 130, and the image sensing device 100 is connected to the image input unit 110.

This embodiment has as its object to calculate the position and orientation information of a viewpoint of an image sensed by the image sensing device 100 (AR registration).

Figure 2:
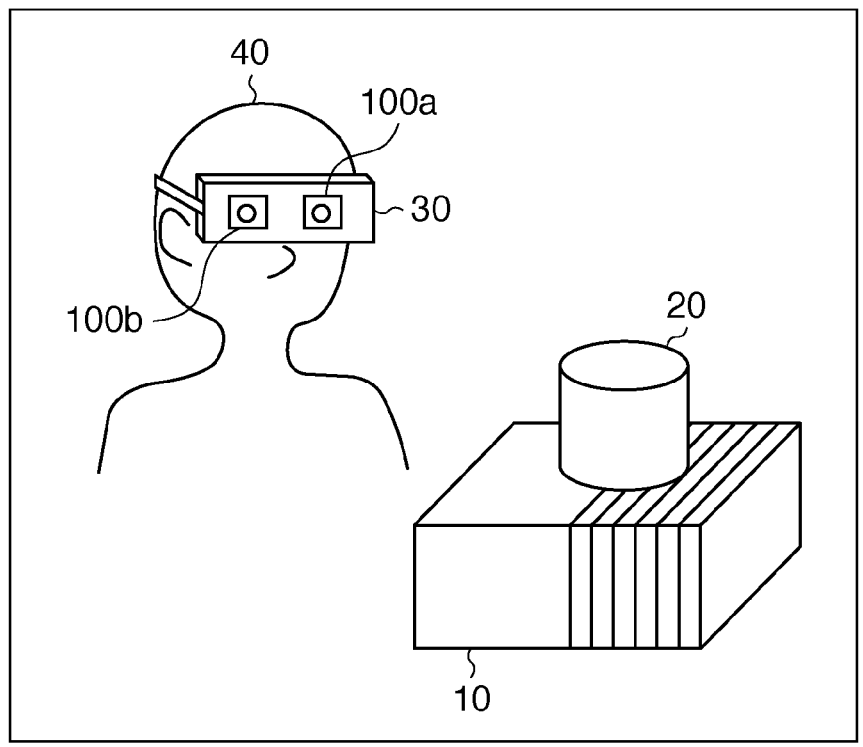
FIG. 2 is a view showing a state in which the user uses the system according to the first embodiment of the present invention.

FIG. 2 is a view showing a state in which the user uses the system according to this embodiment. FIG. 2 illustrates a case in which the present invention is applied to "AR registration" to be described below.

The user wears a video see-through HMD 30 on the head. The HMD 30 includes image sensing devices 100b and 100a which are used to sense images of the physical space to be provided to the right and left eyes of the user, respectively. In this embodiment, the following description will be made under the assumption that the image sensing device 100 shown in FIG. 1 corresponds to the image sensing device 100a shown in FIG. 2.

On the physical space, a physical object (an object to be observed) 10 having an outer appearance that can be expressed by a plurality of line segments is arranged, and the image sensing device 100 senses an image of the physical space including this physical object 10.

An image sensed by the image sensing device 100 is transferred to the image input unit 110 in the position and orientation measurement apparatus 1, and the image input unit 110 outputs the transferred image to the subsequent position and orientation calculation unit 130. As will be described in detail later, various data associated with virtual objects are registered in the model data storage unit 120. Therefore, the position and orientation calculation unit 130 calculates the position and orientation information of a viewpoint of the image, i.e., that of the image sensing device 100, using the data registered in the model data storage unit 120 and the image received from the image input unit 110. Note that this position and orientation information indicates the position and orientation of the image sensing device 100 with respect to the physical object 10.

The position and orientation measurement apparatus 1 generates, using a generation unit (not shown), an image when a virtual object 20 is laid out on a virtual space and is viewed from the viewpoint having the position and orientation indicated by the position and orientation information calculated by the position and orientation calculation unit 130. Then, an output unit (not shown) of the position and orientation measurement apparatus 1 generates a composite image by composing the generated image of the virtual object on the image of the physical space sensed by the image sensing device 100 (the image sensing devices 100a and 100b in FIG. 2), and outputs the generated composite image to a display device of the HMD 30.

Note that the position and orientation measurement may be made using not only the image sensed by the image sensing device 100 but also an image sensed by the image sensing device 10b. However, in this embodiment, assume that only an image sensed by the image sensing device 100 is used.

Respective units which configure the position and orientation measurement apparatus 1 shown in FIG. 1 will be described in more detail below.

The image input unit 110 receives an image sensed by the image sensing device 100 from it, and transfers the received image to the subsequent position and orientation calculation unit 130. The image input unit 110 is implemented by a video capture board when the output from the image sensing device 100 is an analog output of NTSC or the like. Alternatively, the image input unit 110 is implemented by, e.g., an interface board when the output from the image sensing device 100 is a digital output of IEEE1394 or the like. In this embodiment, the image input unit 110 acquires an image of the physical space sensed by the image sensing device 100, but it may acquire an image of the physical space, which is stored in advance in a storage device.

The model data storage unit 120 holds data associated with various virtual objects (3D virtual objects). These data include those associated with a virtual object which simulates the outer appearance of the physical object 10.

Figures 3A, 3B, 3C, 3D:
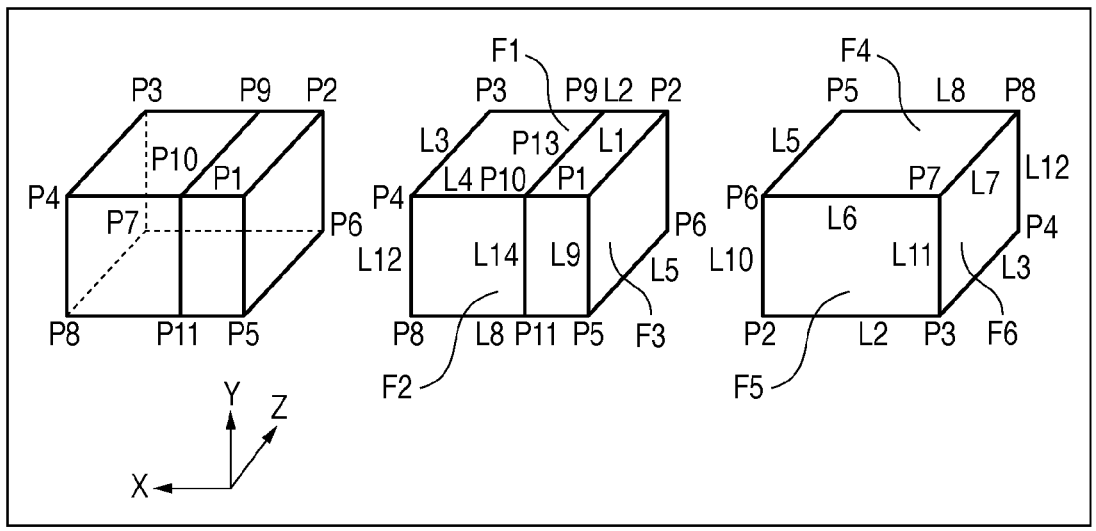
FIGS. 3A to 3D are views for explaining an example of the configuration of data (model data) associated with a virtual object which simulates the outer appearance of a physical object 10.

FIG. 3A is a view for explaining an example of the configuration of data (model data) associated with a virtual object which simulates the outer appearance of the physical object 10. The virtual object is defined by information of vertices, information of planes configured by coupling the vertices, and information of line segments (those which couple between the vertices) that configure the planes. In other words, the data associated with the virtual object include these pieces of information.

The virtual object handled by FIG. 3A is a rectangular parallelepiped. However, the following description is practically the same even when the virtual object has any other shapes.

As shown in the left view of FIG. 3A, the virtual object is a rectangular parallelepiped configured by eight points of vertices P1 to P8. An X-axis of a coordinate system of the rectangular parallelepiped is set to agree with a direction from the vertex P1 to the vertex P4, a Y-axis is set to agree with a direction from the vertex P5 to the vertex P1, and a Z-axis is set to agree with a direction from the vertex P1 to the vertex P2. An origin of the coordinate system of the rectangular parallelepiped is set at the vertex P5.

As shown in the central and right views of FIG. 3A, the virtual object is configured by planes F1 to F6. Likewise, the virtual object is configured by line segments L1 to L12. Furthermore, the virtual object has a line segment L13 on the plane F1, and a line segment L14 on the plane F2. The line segment L13 is defined by the vertices P9 and P10, and the line segment L14 is defined by the vertices P10 and P11.

FIG. 3B shows an example of the configuration of a table (vertex information) which registers data associated with the vertices that configure the virtual object of the rectangular parallelepiped. As shown in FIG. 3B, indices and 3D coordinate values (X, Y, Z) are registered for respective vertices in the table. That is, the indices (P1 to P11) and 3D coordinate values (X, Y, Z) of the vertices P1 to P11 are registered in the vertex information in the table format.

FIG. 3C shows an example of a table (plane information) which registers data associated with the planes that configure the virtual object of the rectangular parallelepiped. As shown in FIG. 3C, the indices of the vertices that configure the planes are registered in the order of connection for respective planes in the table. For example, the plane F2 is formed by connecting the vertices P1, P4, P8, and P5 in turn.

FIG. 3D shows an example of the configuration of a table (line segment information) which registers data associated with the line segments that configure the virtual object of the rectangular parallelepiped. As shown in FIG. 3D, the indices of the vertices which configure the two ends, and structure defining levels which are set in advance are registered for respective line segments in the table. For example, the line segment L2 is that which couples the vertices P2 and P3, and has a structure defining level="0".

The structure defining level will be described below. In this embodiment, the structure defining level includes two levels, i.e., "structure defining level 0" and "structure defining level 1". The structure defining level of a line segment which defines the outer shape of the virtual object is set to be "0", and that of other line segments is set to be "1". Of the line segments L1 to L14, the line segments L1 to L12 are those which define the outer shape of the virtual object, and have a structure defining level="0". The structure defining level of other line segments is "1". In case of the physical object 10 shown in FIG. 2, the structure defining level of the line segments which configure the respective planes of the physical object 10 as the rectangular parallelepiped is set to be "0", and that of the line segments inside the planes indicated as a repetitive pattern is set to be "1".

That is, when the line segments which configure the virtual object are divided into a plurality of groups, defining data (the 3D coordinate values of the vertices that configure the two ends of each line segment) required to define each line segment which belongs to each group are managed for respective groups in the model data storage unit 120. Note that the "groups" include a "group to which line segments having a structure defining level="0" belong", and a "group to which line segments having a structure defining level="1" belong".

In this manner, in the model data storage unit 120, the aforementioned vertex information, plane information, and line segment information are registered for each virtual object. Furthermore, texture map data and the like may also be registered.

Referring back to FIG. 1, the position and orientation calculation unit 130 calculates the position and orientation information of the image sensing device 100 on a coordinate system with reference to the physical object 10 (reference coordinate system) based on the image input from the image input unit 110 and the model data registered in the model data storage unit 120.

Figure 4:
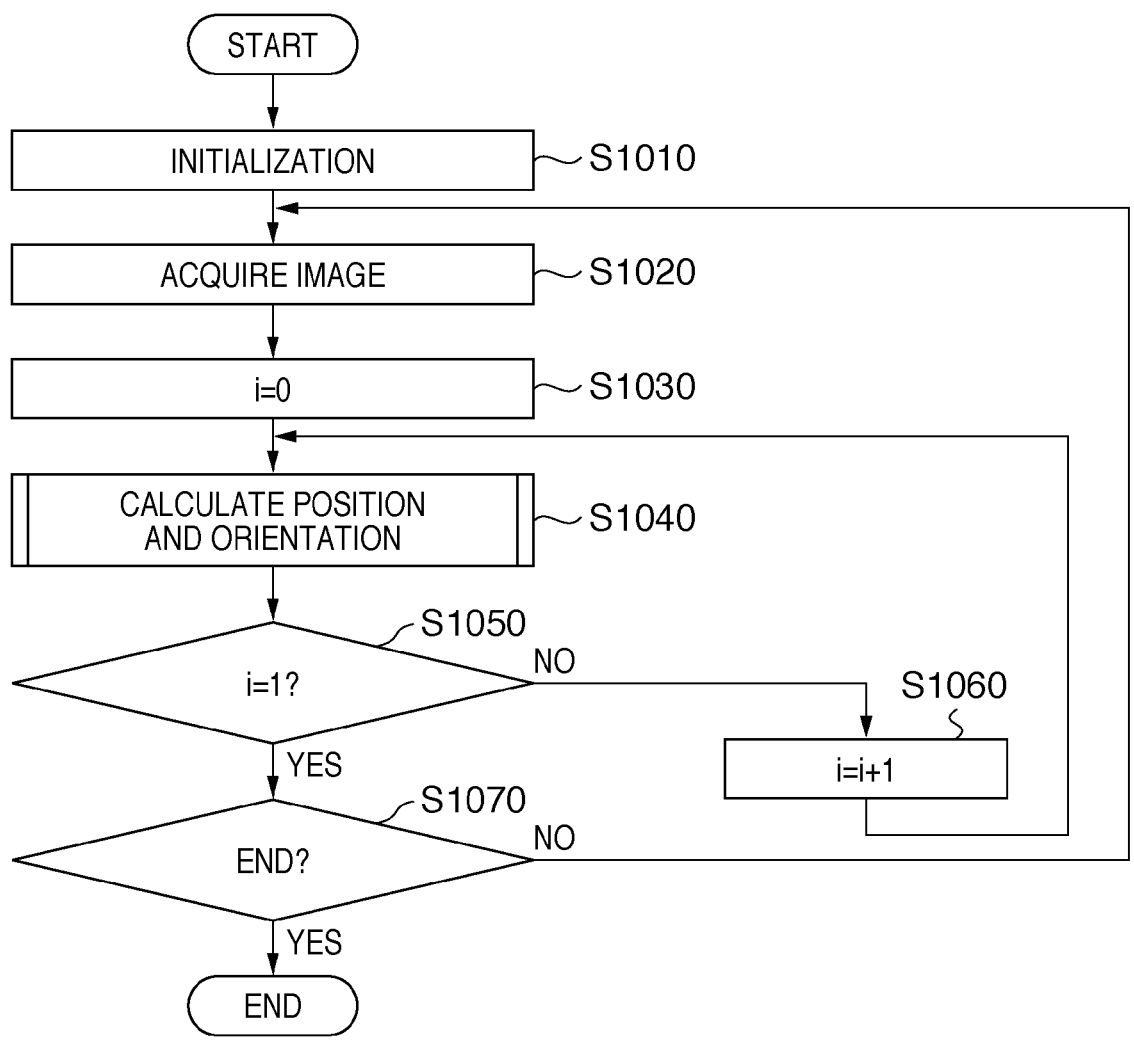
FIG. 4 is a flowchart of processing to be executed by a position and orientation measurement apparatus 1 to calculate position and orientation information of an image sensing device 100.

The processing executed by the position and orientation measurement apparatus 1 to calculate the position and orientation information of the image sensing device 100 will be described below with reference to FIG. 4 which shows the flowchart of that processing.

In step S1010, the position and orientation calculation unit 130 executes initialization processing. In this initialization processing, position and orientation information (initial values) indicating an approximate position and orientation of the image sensing device 100 on the reference coordinate system is set.

In this embodiment, since the position and orientation information of the image sensing device 100 is calculated by sequentially updating the position and orientation information indicating the approximate position and orientation of the image sensing device 100, the approximate position and orientation information of the image sensing device 100 is required to be given as initial values before updating processing of the position and orientation information. Hence, for example, predetermined position and orientation information may be set as the initial values, and the image sensing device 100 may be laid out at the position and orientation indicated by the set position and orientation information. As described in non-patent reference 1, an artificial index which can be identified by detecting it only in an image may be laid out, the position and orientation of the image sensing device may be calculated from the correspondence between the image coordinates of respective vertices of this artificial index and the 3D positions of these vertices on the reference coordinate system, and the calculated values may be used as the initial values. Furthermore, a six-degrees-of-freedom position and orientation sensor such as a magnetic sensor, optical sensor, or ultrasonic sensor may be attached to the image sensing device 100, and position and orientation information obtained from this sensor may be used as the initial values. Also, the position and orientation information of the image sensing device 100 measured by using the artificial index and the aforementioned six-degrees-of-freedom position and orientation sensor or a three-degrees-of-freedom orientation sensor and three-degrees-of-freedom position sensor together may be used as the initial values.

In step S1020, the image input unit 110 acquires an image of the physical space sensed by the image sensing device 100.

In step S1030, the position and orientation calculation unit 130 initializes a variable i indicating a structure defining level to zero. Assume that the position and orientation calculation unit 130 executes processes in the subsequent steps unless otherwise designated.

In step S1040, the position and orientation calculation unit 130 specifies line segments corresponding to a structure defining level equal to or smaller than a value indicated by the variable i with reference to the line segment information (FIG. 3D). The position and orientation calculation unit 130 calculates the position and orientation information of the image sensing device 100 on the reference coordinate system using the specified line segments and the image acquired in step S1020.

Figure 5:
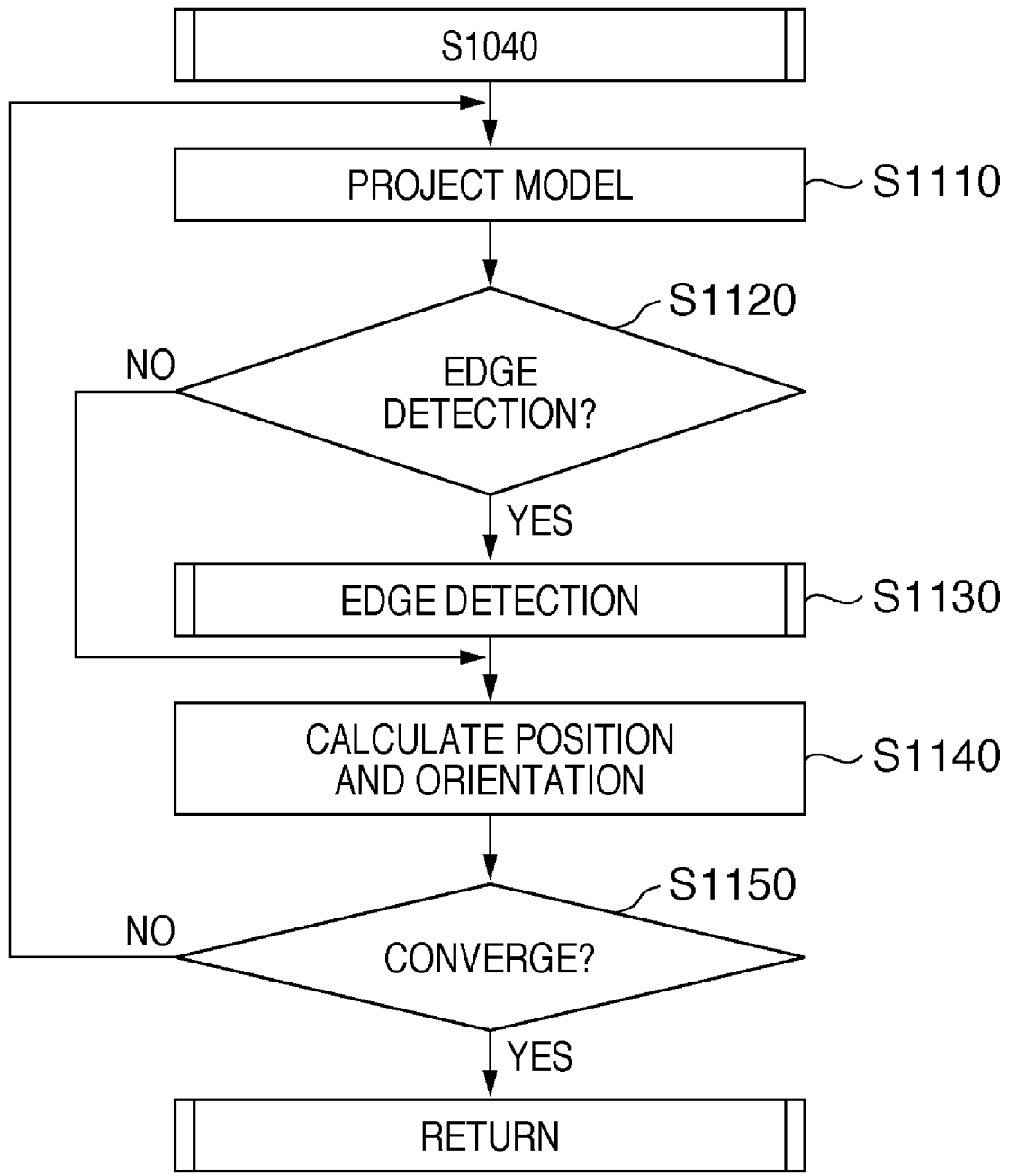
FIG. 5 is a flowchart showing details of processing in step S1040.

Details of the processing in step S1040 will be described below with reference to the flowchart of FIG. 5. Assume that the position and orientation calculation unit 130 executes respective steps shown in FIG. 5 unless otherwise designated.

In step S1110, the position and orientation calculation unit 130 specifies line segments (target line segments) corresponding to a structure defining level equal to or smaller than a value indicated by the variable i with reference to the line segment information (FIG. 3D) stored in the model data storage unit 120. For example, if the value of the variable i is "0", the position and orientation calculation unit 130 specifies line segments having the structure defining level="0" or less, i.e., the line segments L1 to L12 as target line segments.

The vertices of the two ends of each of the target line segments when the virtual object is laid out on the virtual space at the position and orientation of the physical object 10 are projected onto a known projection plane (the image of the physical space in this case) using the currently obtained position and orientation information of the image sensing device 100. Then, equations of straight lines that couple between the projected vertices are calculated. This equation of a straight line is calculated as that of a straight line which couples between two points on the projection plane, which are specified by 2D coordinate values obtained by projecting the 3D coordinate values of the two ends of a line segment onto the projection plane.

That is, "projection" in this embodiment means not to render the projected line segment on the projection plane but to virtually project a line segment to implement a certain processing for, e.g., calculating the coordinate positions of the two ends of the line segment after projection.

In this embodiment, assume that the virtual space and physical space share a coordinate system. Therefore, when the virtual object is laid out at the position and orientation of the physical object 10, it is ideally laid out to perfectly overlap the physical object 10.

The "currently obtained position and orientation information of the image sensing device 100" corresponds to that as the initial values when step S1110 is executed for the first time. If the variable i=0 in the second or subsequent execution of step S1110, the aforementioned position and orientation information corresponds to that calculated one frame before. If the variable i≠0, the aforementioned position and orientation information corresponds to that calculated in previous step S1040.

In order to perform projection onto the projection plane, camera specific parameters such as the focal length and viewpoint position of the image sensing device 100 have to be given in addition to the position and orientation information of the image sensing device 100. In this embodiment, assume that these given parameters are recorded in advance in a memory (not shown) of the position and orientation measurement apparatus 1.

Figure 6A:
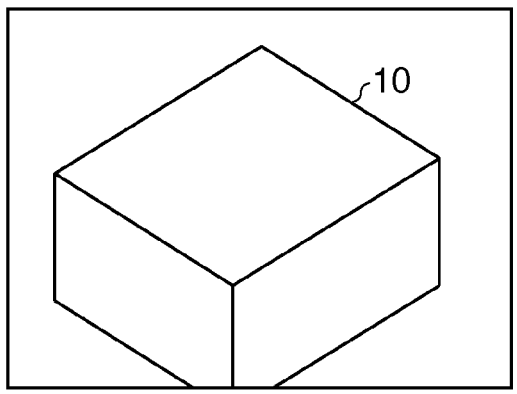
FIGS. 6A and 6B are views for explaining line segments projected onto an image of the physical space.
Figure 6B:
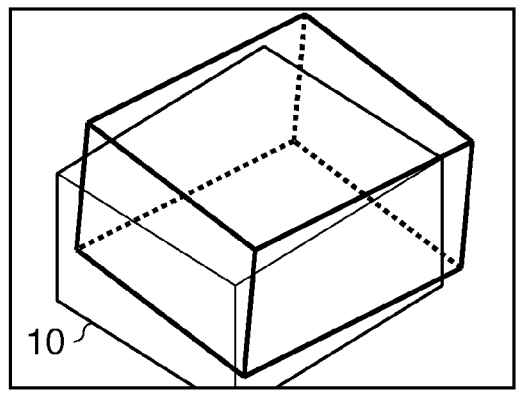

FIGS. 6A and 6B are views for explaining the line segments projected onto the image of the physical space. FIG. 6A shows the image of the physical space itself, and the physical object 10 appears. FIG. 6B shows an image obtained when the line segments (indicated by the bold lines) are projected onto the image of the physical space. When the position and orientation indicated by the position and orientation information used at the time of projection is different from the actual position and orientation of the image sensing device 100, the line segments which configure the physical object 10 have differences from the projected line segments, as shown in FIG. 6B. Line segments indicated by the broken lines in FIG. 6B represent those, which are invisible since they are occluded in practice, of the projected line segments.

The position and orientation calculation unit 130 checks in step S1120 if edge detection processing is applied to the image of the physical space acquired in step S1020. In this embodiment, the position and orientation information of the image sensing device 100 is optimized by iterative calculations using the nonlinear optimization method. Since the edge detection is processing that requires high calculation cost, it is executed in only the first iterative calculation but it is skipped in the second and subsequent iterative calculations.

If it is determined in step S1120 that the edge detection is applied (in case of the first calculation), the process advances to step S1130. On the other hand, if the edge detection is skipped (in case of the second or subsequent calculation), the process jumps to step S1140.

Figure 7:
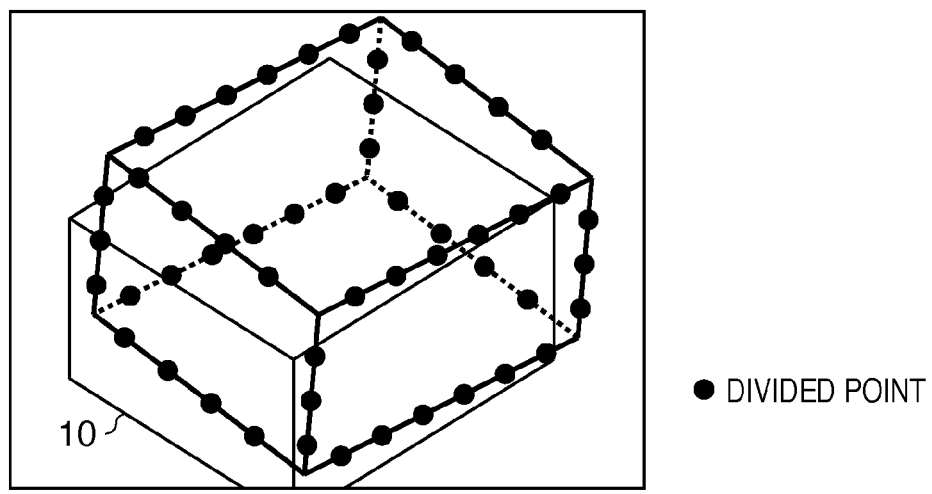
FIG. 7 is a view showing divided points on the image for respective line segments.

In step S1130, the position and orientation calculation unit 130 applies the edge detection processing to the image of the physical space acquired in step S1020. The edge detection is executed as follows. Using the equations of straight lines calculated in step S1110, divided points are set to divide the projected line segments on the image at equal intervals. FIG. 7 shows the divided points on the image in association with the respective line segments. Let N be the total number of divided points, and DPj (j=1, 2, . . . , N) be each divided point. The total number N of divided points can be controlled by changing the interval between the neighboring divided points on the image. Alternatively, the interval between the neighboring divided points may be sequentially changed to make the total number of divided points be constant.

Figure 8:
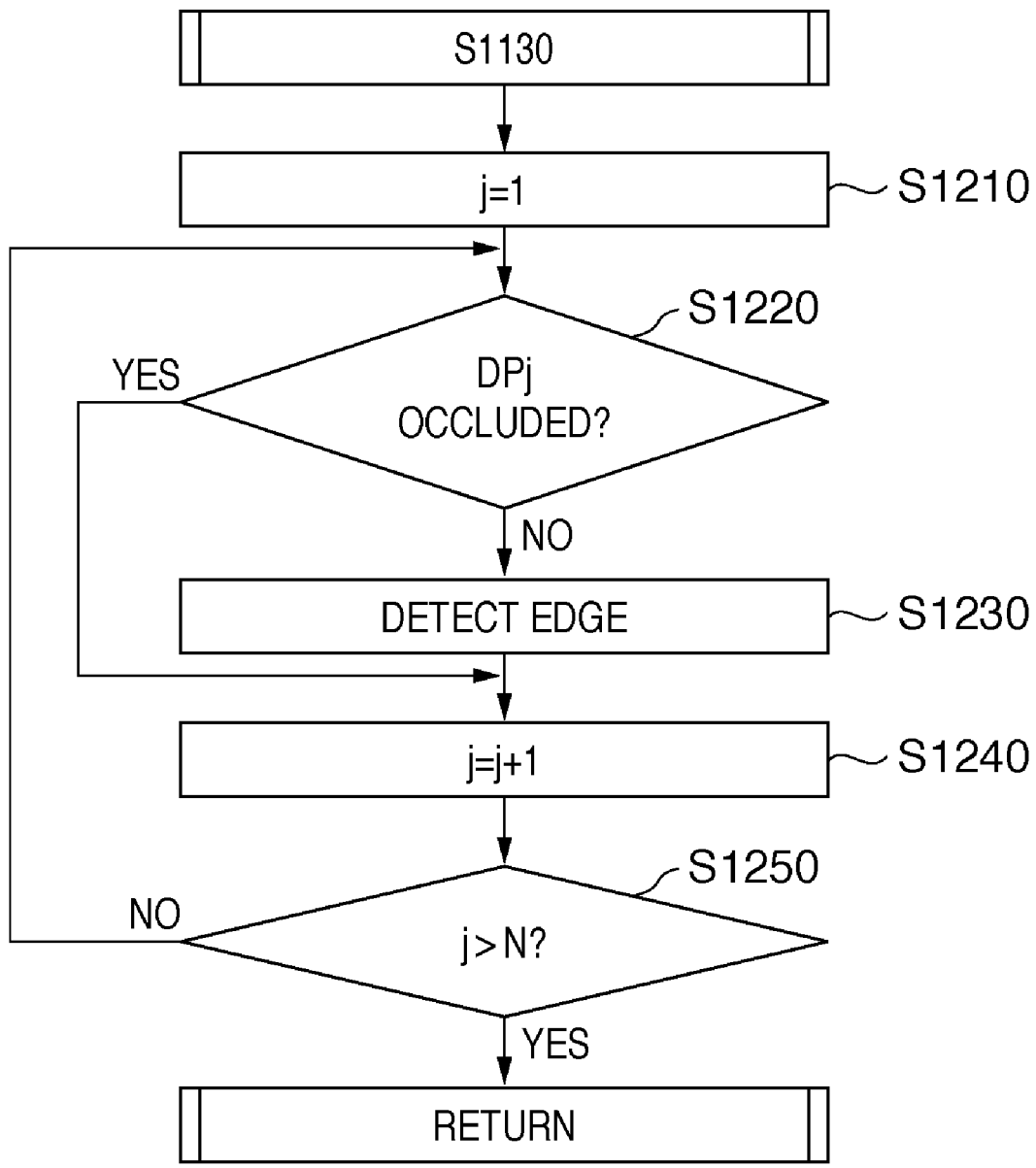
FIG. 8 is a flowchart showing details of processing in step S1130.

Details of the processing in step S1130 will be described below with reference to the flowchart shown in FIG. 8.

In step S1210, the position and orientation calculation unit 130 initializes a variable j to 1.

The position and orientation calculation unit 130 determines in step S1220 if the divided point DPj is occluded. More specifically, when the divided point DPj is occluded behind another plane of the virtual object, i.e., when it is a divided point on the broken line shown in FIG. 7, the divided point DPj is invisible. Whether or not the divided point DPj is visible can be determined by rendering this divided point after the virtual object is rendered using graphics hardware, and then confirming if a depth buffer of the graphics hardware is updated, as described in, e.g., non-patent reference 7. If the divided point DPj is occluded, the process jumps to step S1240. On the other hand, if the divided point DPj is not occluded, the process advances to step S1230.

Figure 9:
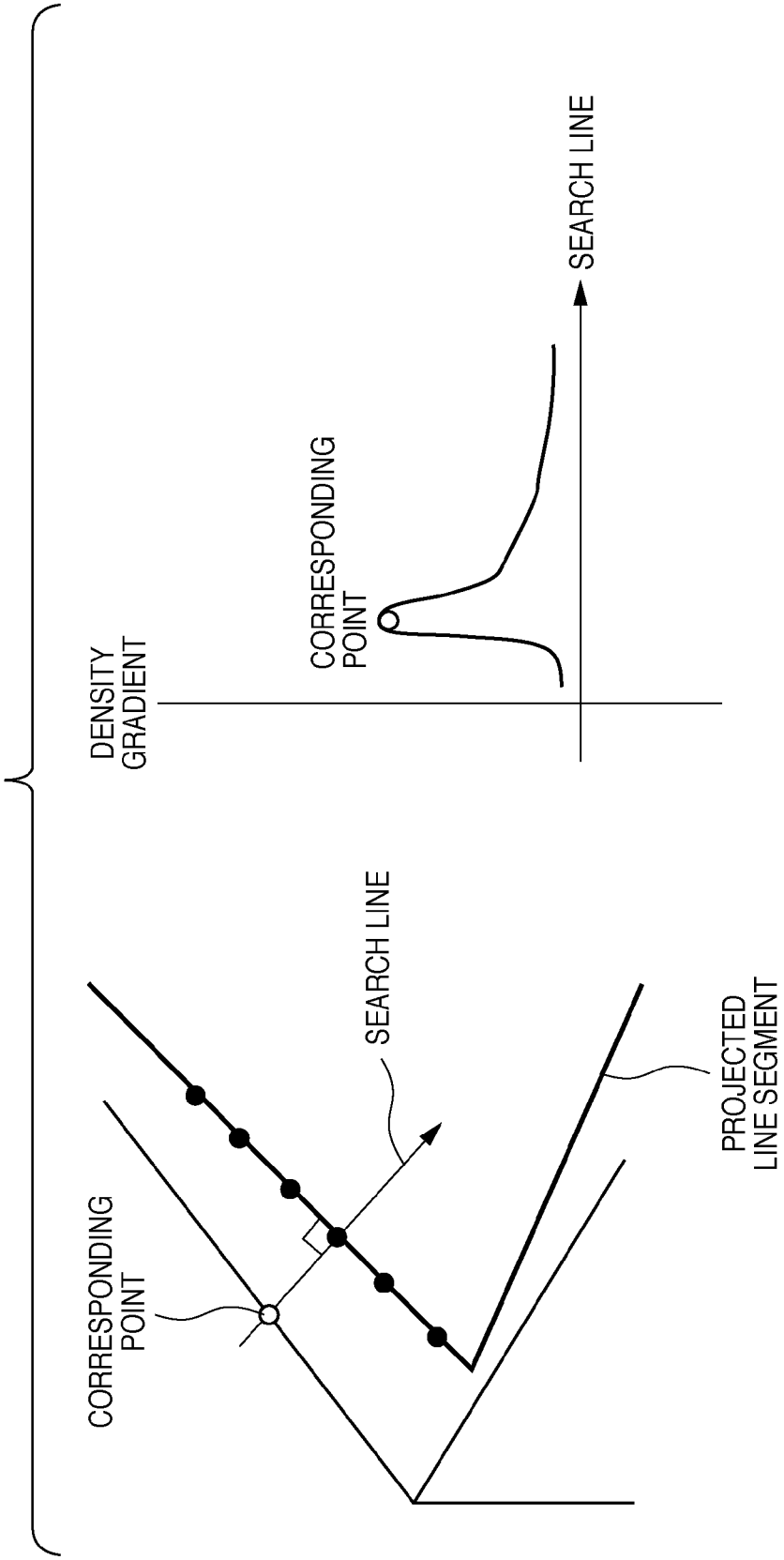
FIG. 9 is a view for explaining an edge detection method according to the first embodiment of the present invention.

In step S1230, the position and orientation calculation unit 130 detects an edge corresponding to the divided point DPj. FIG. 9 is a view for explaining the edge detection method in this embodiment. As shown in FIG. 9, a one-dimensional search for an edge is conducted at each divided point on a line segment (to be referred to as a search line hereinafter) which is parallel to the normal direction of the projected line segment and passes through that divided point. The edge exists at a position where a density gradient assumes a maximal value on the search line. In this embodiment, when a plurality of edges exist on the search line, an edge closest to the divided point is selected as a corresponding point, and its image coordinates and 3D coordinates of the divided point are held. Note that the present invention is not limited to an edge closest to the divided point. For example, an edge which has a largest absolute value of a maximal value of a density gradient on the search line may be selected as a corresponding point. Also, as described in non-patent reference 6, a plurality of edges may be held as candidates in place of one edge.

In step S1240, the position and orientation calculation unit 130 increments the value of the variable j by one.

The position and orientation calculation unit 130 checks in step S1250 if j>N, i.e., if the processing for all the divided points DPj is complete. As a result of checking, if j>N, i.e., if the processing for all the divided points DPj is complete, the process returns to step S1140 in FIG. 5. On the other hand, if j≦N, i.e., if the processing for all the divided points DPj is not complete yet, the process returns to step S1220 to execute the processes in respective steps using the incremented variable j.

Figure 10:
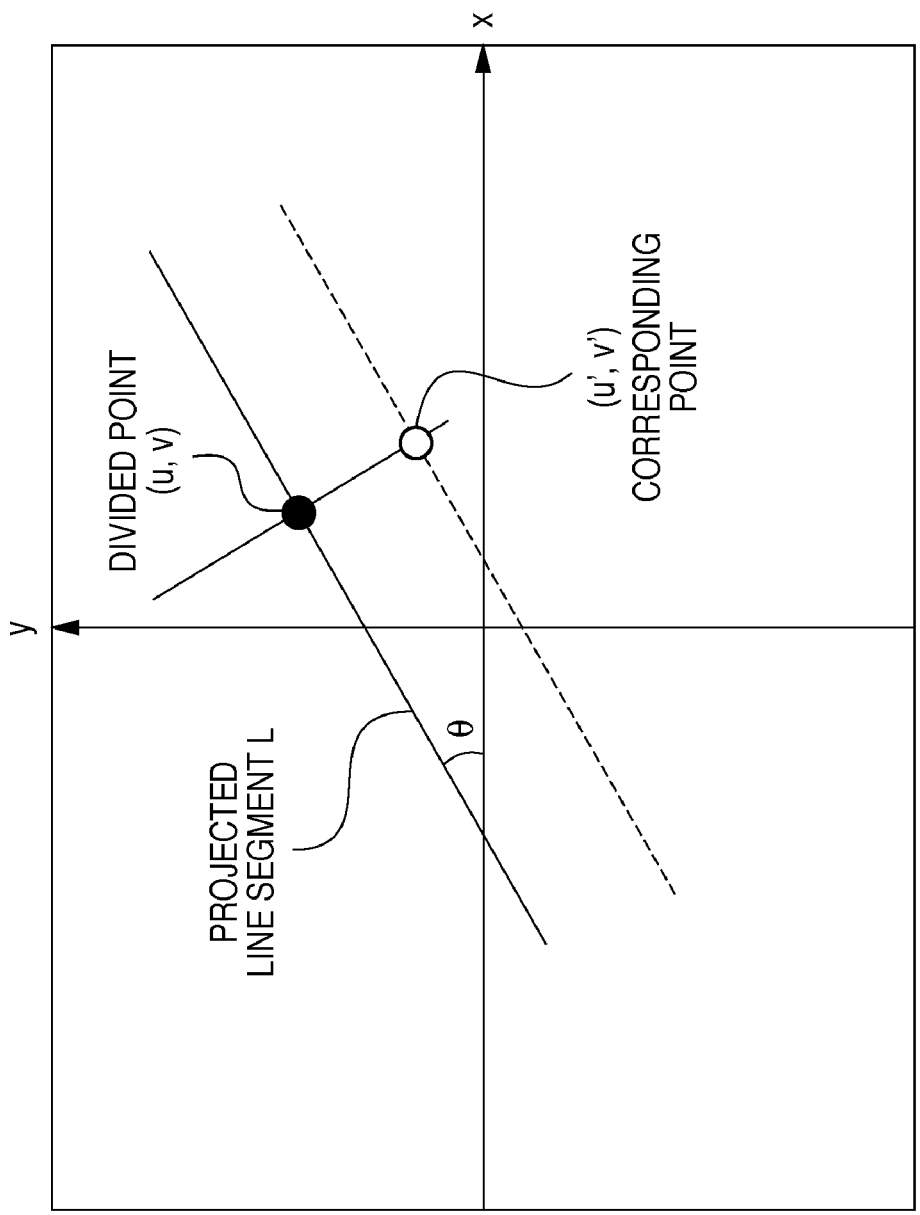
FIG. 10 is a graph for explaining a method of calculating the position and orientation information of the image sensing device 100 using line segment information.

Referring back to FIG. 5, the position and orientation calculation unit 130 calculates the position and orientation information of the image sensing device 100 in step S1140. Let Nc be the total number of divided points, which are not occluded and the corresponding points of which are calculated in step S1230, of the divided points DPj. The position and orientation information of the image sensing device 100 is calculated by correcting (updating) the approximate position and orientation information of the image sensing device 100 by iterative calculations using the nonlinear optimization calculations. FIG. 10 is a view for explaining the method of calculating the position and orientation information of the image sensing device 100 using the line segment information. In FIG. 10, the horizontal direction of an image is defined as an x-axis, and the vertical direction is defined as a y-axis. Let (u0, v0) be the image coordinates of a certain divided point, and θ be a slope of a line segment L, to which this divided point belongs, on the image with respect to x-axis. A normal vector of the line segment L on the image is expressed by (sin θ, −cos θ). Furthermore, let (u', v') be the image coordinates of a corresponding point of this divided point.

Assuming that r=u0×sin θ−v0×cos θ (constant), an equation of a straight line of the line segment L is given by:

$$x \sin \theta - y \cos \theta = r \quad (1)$$

A straight line L' (indicated by the broken line in FIG. 10) which passes through this corresponding point (u', v') and is parallel to the line segment L will be examined below. Likewise, assuming that d=u'×sin θ−v'×cos θ (constant), an equation of a straight line of the line segment L' is given by:

$$x \sin \theta - y \cos \theta = d \quad (2)$$

The image coordinates (u, v) of this divided point change depending on the position and orientation information of the image sensing device 100. The position and orientation information of the image sensing device 100 has six degrees of freedom. Let p be a parameter that represents the position and orientation information of the image sensing device 100. p is a six-dimensional vector and includes three elements that represent the position of the image sensing device 100, and three elements that represent the orientation. The three elements that represent the orientation are expressed using, e.g., an Euler angle or by a three-dimensional vector in which directions represent a rotation axis, and a size represents a rotation angle. The image coordinates (u, v) of the divided point can be approximated by linear Taylor's expansion in the vicinity of (u0, v0), as given by:

$$u \approx u_0 + \sum_{i=1}^{6} \frac{\partial u}{\partial p_i}\Delta p_i, \quad v \approx v_0 + \sum_{i=1}^{6} \frac{\partial v}{\partial p_i}\Delta p_i \qquad (3)$$

Since the method of deriving partial differentials ∂u/∂pi and ∂v/∂pi of u and v are disclosed in, e.g., non-patent reference 8, a description thereof will not be given.

A correction value Δp of the position and orientation information p of the image sensing device 100 is calculated, so that (u, v) given by relations (3) exist on the straight line given by equation (2). Substitution of relations (3) into equation (2) yields:

$$\left(u_0 + \sum_{i=1}^{6} \frac{\partial u}{\partial p_i}\Delta p_i\right)\sin\theta - \left(v_0 + \sum_{i=1}^{6} \frac{\partial v}{\partial p_i}\Delta p_i\right)\cos\theta = d \qquad (4)$$

Equation (4) is arranged and is given by:

$$\sin\theta \sum_{i=1}^{6} \frac{\partial u}{\partial p_i}\Delta p_i - \cos\theta \sum_{i=1}^{6} \frac{\partial v}{\partial p_i}\Delta p_i = d - r \qquad (5)$$

Since equation (5) holds for Nc divided points, a linear simultaneous equation for Δp holds like:

$$\begin{bmatrix} \sin\theta_1\frac{\partial u_1}{\partial p_1} - \cos\theta_1\frac{\partial v_1}{\partial p_1} & \sin\theta_1\frac{\partial u_1}{\partial p_2} - \cos\theta_1\frac{\partial v_1}{\partial p_2} & \cdots & \sin\theta_1\frac{\partial u_1}{\partial p_6} - \cos\theta_1\frac{\partial v_1}{\partial p_6} \\ \sin\theta_2\frac{\partial u_2}{\partial p_1} - \cos\theta_1\frac{\partial v_2}{\partial p_1} & \sin\theta_2\frac{\partial u_2}{\partial p_2} - \cos\theta_1\frac{\partial v_2}{\partial p_2} & \cdots & \sin\theta_2\frac{\partial u_2}{\partial p_6} - \cos\theta_1\frac{\partial v_2}{\partial p_6} \\ \vdots & \vdots & \ddots & \vdots \\ \sin\theta_{Nc}\frac{\partial u_{Nc}}{\partial p_1} - \cos\theta_{Nc}\frac{\partial v_{Nc}}{\partial p_1} & \sin\theta_{Nc}\frac{\partial u_{Nc}}{\partial p_2} - \cos\theta_{Nc}\frac{\partial v_{Nc}}{\partial p_2} & \cdots & \sin\theta_{Nc}\frac{\partial u_{Nc}}{\partial p_6} - \cos\theta_{Nc}\frac{\partial v_{Nc}}{\partial p_6} \end{bmatrix} \begin{bmatrix} \Delta p_1 \\ \Delta p_2 \\ \Delta p_3 \\ \Delta p_4 \\ \Delta p_5 \\ \Delta p_6 \end{bmatrix} = \begin{bmatrix} d_1 - r_1 \\ d_2 - r_2 \\ \vdots \\ d_{Nc} - r_{Nc} \end{bmatrix} \qquad (6)$$

Equation (6) is simply expressed as:

$$J\Delta p = E \qquad (7)$$

Based on equation (7), Δp is calculated using a generalized inverse matrix $(J^T \cdot J)^{-1}$ of a matrix J according to the Gauss-Newton method. However, since the edge detection suffers many detection errors, a robust estimation method to be described below is used. In general, an error (d−r) becomes large at a divided point corresponding to an erroneously detected edge. For this reason, a degree of contribution to simultaneous equations (6) and (7) becomes large, and the precision of calculated Δp consequently lowers. Hence, a small weight is assigned to a divided point with a large error (d−r), and a large weight is assigned to a divided point with a small error (d−r). The weight is assigned by a Tukey function as given, e.g., by:

$$w(d-r) = \begin{cases} (1 - ((d-r)/c)^2)^2 & |d-r| \le c \\ 0 & |d-r| > c \end{cases} \qquad (8)$$

Note that the function that assigns the weight need not always be the Tukey function. For example, a function that can assign a small weight to a divided point with a large error (d−r) and a large weight to a divided point with a small error (d−r) like a Huber function given by:

$$w(d-r) = \begin{cases} 1 & |d-r| \le k \\ k/|d-r| & |d-r| > k \end{cases} \qquad (9)$$

may be used.

Let wi be a weight corresponding to a divided point DPi. A weight matrix W is defined by:

$$W = \begin{bmatrix} w_1 & & & 0 \\ & w_2 & & \\ & & \ddots & \\ 0 & & & w_{Nc} \end{bmatrix} \qquad (10)$$

The weight matrix W is an Nc×Nc square matrix which includes all "0"s other than diagonal components, which include the weights wi. Using this weight matrix W, equation (7) is modified like:

$$WJ\Delta p = WE \qquad (11)$$

The correction value Δp is calculated by solving equation (11), as given by:

$$\Delta p = (J^T W J)^{-1} J^T W E \qquad (12)$$

Using Δp obtained by the aforementioned processes, the currently obtained position and orientation information of the image sensing device 100 is updated.

The aforementioned calculation processes are executed in step S1140.

The position and orientation calculation unit 130 determines in step S1150 if the calculations of the position and orientation information of the image sensing device 100 have converged. This determination processing can be determined by checking, for example, if the correction value Δp calculated in step S1140 is equal to or smaller than a sufficiently small threshold, if the sum total of errors (d−r) is equal to or smaller than a sufficiently small threshold, or if a change in sum total of errors is equal to or smaller than a sufficiently small threshold. As a result of such determination processing, if it is determined that the calculations of the position and orientation information of the image sensing device 100 have converged, the control returns to step S1050 in FIG. 4. On the other hand, if it is determined that the calculations of the position and orientation information of the image sensing device 100 have not converged yet, the process returns to step S1110. Then, using the position and orientation information of the image sensing device 100 calculated in step S1140 as approximate position and orientation information of the image sensing device 100, the processes in the subsequent steps are repeated. Respective line segments are projected again. After that, based on the equations of straight lines L and L' calculated in step S1110, $\partial u/\partial p_i$ and $\partial v/\partial p_i$ are calculated again in step S1130, and the correction value $\Delta p$ is calculated again using equation (12).

Note that the Gauss-Newton method is used as the nonlinear optimization method in this embodiment. Alternatively, a Newton-Raphson method, Levernberg-Marquadt method, steepest descent method, conjugate gradient method, and the like may be used.

Referring back to FIG. 4, the position and orientation calculation unit 130 determines in step S1050 if the variable i=1, i.e., if the processing is complete for all the structure defining levels. In this embodiment, since the structure defining levels are two levels, if the variable i=1, the process advances to step S1070; if i≠1, the process advances to step S1060. In step S1060, the position and orientation calculation unit 130 increments the value of the variable i by one. After that, the process then returns to step S1040, and the position and orientation calculation unit 130 executes the processes in the subsequent steps using the incremented variable i. That is, the position and orientation calculation unit 130 calculates the position and orientation information of the image sensing device 100 on the reference coordinate system using the image acquired in step S1020 and the line segments corresponding to the structure defining level which is equal to or smaller than the value indicated by the incremented variable i.

From the above description, the calculation processing of the position and orientation information of this embodiment can be reworded as follows. That is, when the line segments that configure the virtual object are divided into a plurality of groups, one group is selected from the plurality of groups one by one without any repetition. Every time one group is selected, position and orientation information indicating the approximate position and orientation of the viewpoint of the image is updated using the defining data that belongs to the selected group and the image of the physical space.

After the approximate position and orientation information of the image sensing device 100 is calculated using line segments that define a comprehensive structure, more detailed position and orientation information is calculated using line segments that define a more local structure. In this manner, detection errors of edges corresponding to a repetitive pattern and similar line segments can be prevented, and position and orientation information with high precision can be calculated.

The position and orientation calculation unit 130 then determines in step S1070 if an instruction to end the calculation processing of the position and orientation information is externally input, or if an end condition of the calculation processing is satisfied. If it is determined that such instruction is input or the end condition is satisfied, the position and orientation calculation unit 130 ends the calculation processing via step S1070. Note that the position and orientation information updated a plurality of times by the aforementioned processes is output as final position and orientation information to, for example, the model data storage unit 120.

On the other hand, if such instruction is not input and the end condition is not satisfied, the process returns to step S1020 via step S1070, and the position and orientation calculation unit 130 executes the processes in the subsequent steps for the next frame.

As described above, according to this embodiment, since the position and orientation information of the image sensing device 100 is calculated by nonlinear optimization using the structure defining levels set for respective line segments, the position and orientation information can be prevented from falling into local minimal solutions, and position and orientation information with high precision can be calculated.

[Modification 1-1]

In the first embodiment, after the approximate position and orientation information of the image sensing device 100 is calculated using line segments that define the outer shape of the virtual object, the position and orientation information is updated using line segments with a larger structure defining level. However, when a difference equal to or larger than a given value is generated between the position and orientation information before and after updating, it is considered that the updated position and orientation information falls into local minimal solutions. For this reason, when the difference equal to or larger than the given value (threshold) is generated between the position and orientation information calculated by the first updating processing and that calculated by the next updating processing, the position and orientation information calculated by the first updating processing before updating may be adopted as the final position and orientation information, thus avoiding from falling into local minimal solutions.

[Modification 1-2]

In the first embodiment, two levels, i.e., levels "0" and "1" are set as the structure defining levels. In other words, the line segments which configure the virtual object are divided into two groups. However, three or more structure defining levels may be set. That is, the line segments that configure the virtual object may be divided into three or more groups. For example, when the structure defining levels 0 to (n−1) are set, i.e., when the line segments that configure the virtual object are divided into n groups, it is determined in step S1050 in FIG. 4 if the variable i=(n−1).

[Modification 1-3]

In the first embodiment, when the variable i=1, the line segments corresponding to the structure defining levels "0" and "1" are used to calculate the position and orientation information of the image sensing device 100 on the reference coordinate system. However, when the variable i=1, only the line segments corresponding to the structure defining level "1" may be used to calculate the position and orientation information of the image sensing device 100 on the reference coordinate system.

The same applies to a case in which three or more structure defining levels are set. When the variable i=m, only line segments corresponding to only a structure defining level "m" may be used to calculate the position and orientation information of the image sensing device 100 on the reference coordinate system.

[Modification 1-4]

In the first embodiment, even when the precision of the position and orientation information of the image sensing device 100, which is updated using the line segments corresponding to the structure defining level "0", is sufficiently high, the updating processing of the position and orientation information using the line segments corresponding to the next structure defining level "1" is executed irrespective of that precision. However, when the precision of the updated position and orientation information meets a predetermined criterion, the subsequent updating processing (operation) may be interrupted, and the position and orientation information obtained at that time may be used as the final position and orientation information.

For example, when the average value of the square sums of the left-handed side (d−r) in equation (5) is equal to or smaller than a sufficiently small threshold (for example, within one pixel) or when data which has the weight=0 calculated by the Turkey function is equal to or smaller than a sufficiently small threshold, the subsequent updating processing may be skipped.

[Modification 1-5]

In the first embodiment, the position and orientation information of the current frame is calculated by updating the position and orientation information calculated for the immediately preceding frame a plurality of times in the current frame. However, the approximate position and orientation information of the current frame may be updated using another sensor. For example, the orientation may be updated using the aforementioned three-degrees-of-freedom orientation sensor, or a tilt angle may be updated using a tilt angle sensor. Alternatively, the orientation and position may be updated using an angular velocity sensor or acceleration sensor. Also, the position may be updated using a position sensor. Furthermore, the approximate position and orientation information may be updated using a plurality of sensors together.

[Modification 1-6]

In the first embodiment, the edge detection is executed in only the first calculation in step S1130 in consideration of the calculation load. However, for example, when higher precision is to be pursued or when the calculation time has a margin, the edge detection may be executed in the second and subsequent calculations. That is, by executing the edge detection in step S1130 in the second and subsequent calculations of the iterative calculations, the coordinates (u', v') of a corresponding point on the image of a divided point of each line segment may be updated, and the correction value $\Delta p$ may be calculated using equation (12).

[Second Embodiment]

In the first embodiment, the position and orientation information of the image sensing device 100 is calculated according to the nonlinear optimization method. In this embodiment, the position and orientation information of the image sensing device 100 is calculated according to a stochastic method in place of the nonlinear optimization method. As the stochastic method used in this embodiment, a particle filter (also called CONDENSATION) described in non-patent reference 9 or 10 is used.

In the particle filer, the position and orientation information of the image sensing device 100 at a certain time t is expressed by a set of Np states (to be referred to as particles hereinafter) $(p(i, t), w(i, t))$ $(i=1, \ldots, Np)$. Note that $p(i, t)$ is a state vector which expresses position and orientation information of six degrees of freedom of a particle i at the time t, and $w(i, t)$ is a weight value for the particle i at the time t. A particle with a large weight value has high probability as true position and orientation information of the image sensing device 100, and a particle with a small weight value has low probability of it.

Figure 11:
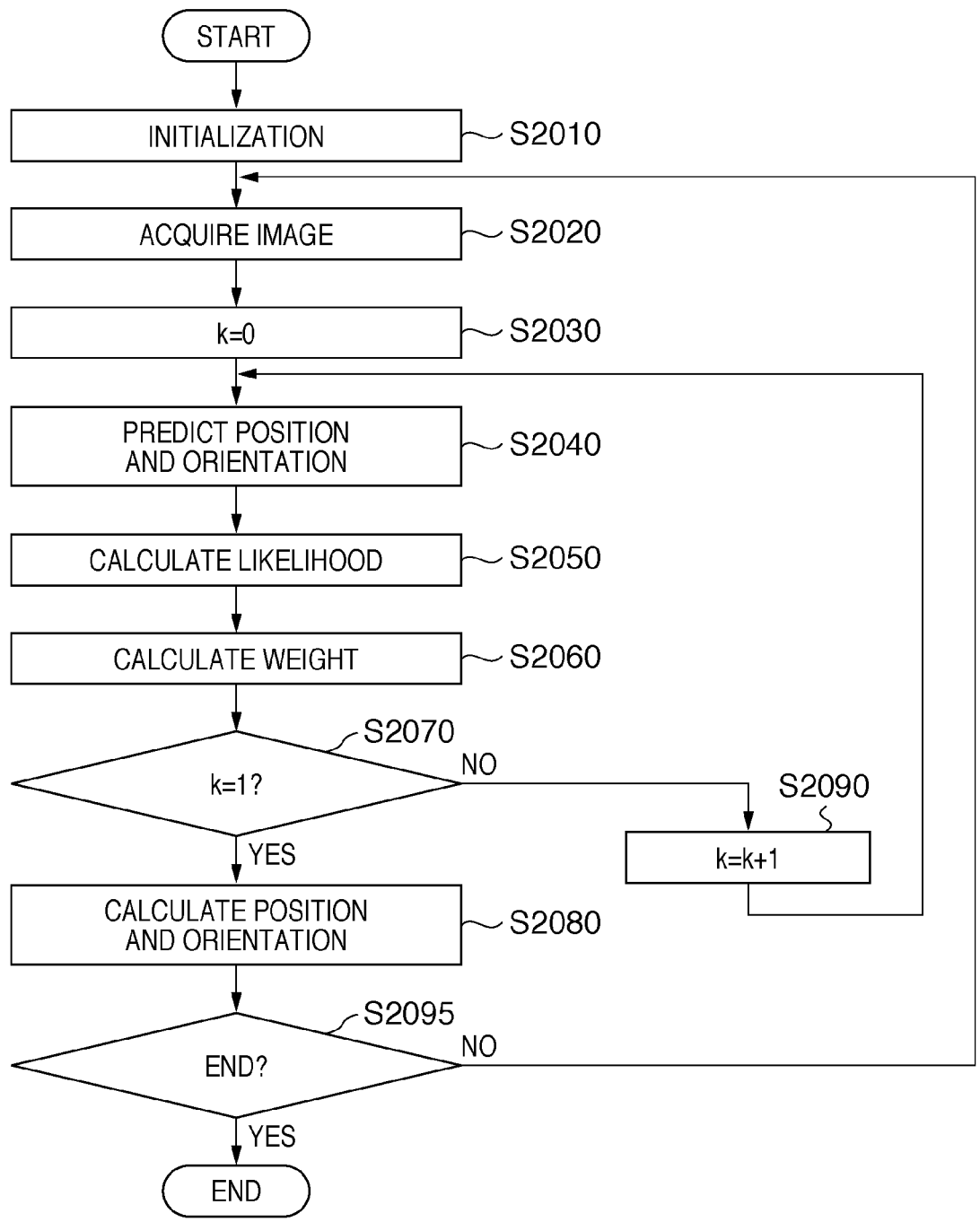
FIG. 11 is a flowchart to be executed by the position and orientation measurement apparatus 1 to calculate the position and orientation information of the image sensing device 100.

Processing executed by the position and orientation measurement apparatus 1 to calculate the position and orientation information of the image sensing device 100 will be described below with reference to FIG. 11 which shows the flowchart of that processing. Note that a system used in this embodiment has the same arrangement as that of the first embodiment, i.e., it has the arrangement shown in FIG. 1.

In step S2010, the position and orientation calculation unit 130 executes initialization processing. In this initialization processing, position and orientation information (initial values) indicating an approximate position and orientation of the image sensing device 100 on the reference coordinate system is set as in the first embodiment. Let $p_{init}$ be a state vector which indicates position and orientation information as the initial values, and has six degrees of freedom. Using $p_{init}$, Np particles are generated. First, a random number z is generated based on a uniform distribution of a section [−1, 1] for each component j (j=1, . . . , 6) of the state vector. That is, a plurality of types of position and orientation information are generated.

The component j of $p_{init}$ is diffused by a random walk like $p_{init}^j = p_{init}^j + z \cdot v$. Note that v is a constant indicating ambiguity of each component. In initialization, assume that a weight value of each particle is uniform ($w_{it} = 1/Np$).

This process is repeated Np times to generate Np particles $(p(i, 0), w(i, 0))$ $(i=1, \ldots, Np)$.

In step S2020, the image input unit 110 acquires an image of the physical space sensed by the image sensing device 100.

In step S2030, the position and orientation calculation unit 130 initializes a variable k indicating a structure defining level to zero. The position and orientation calculation unit 130 executes the processes in the subsequent steps unless otherwise designated.

In step S2040, the position and orientation calculation unit 130 predicts the position and orientation information of the image sensing device 100, i.e., the states of respective particles, based on the structure defining level k. In this case, Np particles $(p(m, t, k), w(m, t, k))$ $(m=1, \ldots, Np)$ are generated by repeating the following processes Np times, and the particles held so far are replaced by the generated particles.

(1) A particle i is selected based on the weight value of each particle and a random number generated from the uniform distribution. In non-patent reference 9, a cumulative probability density $C_i$ is calculated for each particle to speed up particle selection. That is, $C_i$ is calculated by:

$$C_i = 0 \, (i=0)$$

$$C_i = C_{i-1} + W_{(i,t-1)} \, (i=1, \ldots, N_p) \, (\text{when } k=0)$$

$$C_i = C_{i-1} + W_{(i,t,k-1)} \, (i=1, \ldots, N_p) \, (\text{when } k \neq 0) \quad (13)$$

A particle is selected as follows. A random number z is generated based on a uniform distribution of a section [0, 1], and minimum i that satisfies $C_i \geq z$ is selected.

(2) A state of a particle m is predicted. More specifically, as in the initialization in step S2010, a state $p(i, t-1)$ (when k=0) or $p(i, t, k-1)$ (when k≠0) of the selected particle i is diffused by a random walk. The diffusion is attained like $p(j, t, k)^j = p(i, t-1)^j + z \cdot v$ or $p(j, t, k)^j = p_{init}^j + z \cdot v$. v assumes a smaller value with increasing k. With this process, new particles are generated around the particle obtained when k is small. When k=0 and when a motion model between frames is known, $p(i, t-1)$ may be changed based on that model, and a random walk may be applied to the changed state. When a sensor such as an acceleration sensor or angular velocity sensor is available, $p(i, t-1)$ may be changed using the measured value of the sensor. When k≠0, since a motion between frames need not be estimated, the state updating processing based on the motion model is skipped.

By repeating these processes Np times, a new set of particles is obtained.

In step S2050, the position and orientation calculation unit 130 calculates a likelihood of position and orientation information represented by each particle. In step S2050, when the structure defining level k=0, the likelihood is calculated using only line segments with the structure defining level=0, and when k=1, it is calculated using line segments with the structure defining levels=0 and 1.

The likelihood is calculated for each particle. A likelihood LH(i) of a particle i is calculated as follows. Based on position and orientation information $p(i, t, k)$ represented by each particle, line segments with the structure defining level equal to or smaller than k are projected onto the image. Next, a corresponding edge for each equally divided point of a line segment is searched by the same method as in step S1130 in the first embodiment. Then, a distance between the image coordinates (u', v') of the corresponding edge and the projected line segment (already projected line segment) given by equation (1) is calculated. The likelihood LH(i) is calculated by:

$$LH(i) = \frac{1}{\sqrt{2\pi}\,\sigma} \exp\left\{-\frac{1}{2\sigma^2}\sum_{j=1}^{N_c}(d_j - r_j)^2\right\} \quad (14)$$

where σ is set to be large when k is small, and is set to be small when k is large.

Alternatively, a threshold Th may be set for the distance between the corresponding edge and line segment, and the likelihood may be calculated by:

$$LH(i) = \exp\left\{-\sum_{j=1}^{N_c} e_j\right\} \quad (15)$$

However, the following condition is set.

$$e_j = \begin{cases} 1 & (|d_j - r_j| > Th) \\ 0 & (|d_j - r_j| \leq Th) \end{cases} \quad (16)$$

The threshold Th is set to be large when k is small, and is set to be small when k is large. The large likelihood generally represents that position and orientation information expressed by each particle is close to the actual image sensing device 100. By controlling σ or Th according to k, a solution is comprehensively searched when k is small, or a detailed solution is searched around the comprehensive solution when k is large.

That is, the likelihood is calculated using correspondence between the edge and projected line segment.

In step S2060, the position and orientation calculation unit 130 calculates a weight value w(i, t, k) of each particle based on observation. The weight w(i, t, k) is calculated so that the sum total of the weight values of all particles becomes 1 by normalization given by:

$$w_{it} = \frac{LH(i)}{\sum_{j=1}^{N_p} LH(j)} \quad (17)$$

The position and orientation calculation unit 130 determines in step S2070 if the variable k=1, i.e., if the processing is complete for all the structure defining levels. In this embodiment, since the structure defining levels are two levels, if the variable k=1, the particles (p(i, t, k), w(i, t, k)) are set as (p,(i, t), w(i, t)) and the process advances to step S2080; if k≠1, the process advances to step S2090.

In step S2090, the position and orientation calculation unit 130 increments the value of the variable k by one. After that, the process returns to step S2040, and the position and orientation calculation unit 130 executes the processes in the subsequent steps using the incremented variable k.

In step S2080, the position and orientation calculation unit 130 estimates the position and orientation information of the image sensing device 100 at the time t from the set of particles (p,(i, t), w(i, t)). An estimated value $\overline{pt}$ of the position and orientation information of the image sensing device 100 is calculated as, for example, an expected value like:

$$\overline{pt} = \sum_{j=1}^{N_p} w_{(j,t)} p_{(j,t)} \quad (18)$$

That is, the sum total value of results each obtained by multiplying the position and orientation information of each particle by the corresponding weight value is determined as the position and orientation information of the image sensing device 100.

The estimated value $\overline{pt}$ may be determined by position and orientation information p(i, t) of a particle i having a maximum weight w(i, t) in place of the expected value.

As described above, according to this embodiment, by combining the structure defining levels and particle filter, the calculation processing of the high-precision position and orientation information of the image sensing device 100, which does not fall into local minimal solutions, can be executed.

[Modification 2-1]

In the second embodiment, two levels, i.e., levels "0" and "1" are set as the structure defining levels. In other words, the line segments which configure the virtual object are divided into two groups. However, three or more structure defining levels may be set. That is, the line segments that configure the virtual object may be divided into three or more groups. For example, when the structure defining levels 0 to (n−1) are set, i.e., when the line segments that configure the virtual object are divided into n groups, it is determined in step S2070 in FIG. 11 if the variable k=n−1.

[Modification 2-2]

In the second embodiment, when the variable k=1, the line segments corresponding to the structure defining levels "0" and "1" are used to calculate the likelihood. However, when the variable k=1, only the line segments corresponding to the structure defining level "1" may be used to calculate the likelihood.

The same applies to a case in which n structure defining levels are set. When the variable k=m, only line segments corresponding to only a structure defining level "m" may be used to calculate the likelihood.

[Modification 2-3]

In the second embodiment, in step S2050 line segments are projected onto the image for each particle, and an edge search is conducted for each equally divided point of the projected lien segment. However, since this process requires high calculation cost, edge detection (e.g., a Sobel filter or Canny filter) may be applied to the entire image in advance, a process for calculating the gradient on a search line upon execution of the edge search may be omitted. Alternatively, edge directions may be held by the edge detection executed in advance, and an edge on a search line and in a direction similar to the projected line segment may be selected as a corresponding edge.

[Modification 2-4]

In the second embodiment, an expected value of position and orientation information calculated based on the position and orientation information and weight value of each particle or that of a particle with a maximum weight value is determined as the position and orientation information of the image sensing device 100. However, using the result of the particle filter as the approximate position and orientation information, the position and orientation information of the image sensing device 100 may be calculated by the method of the first embodiment.

[Modification 2-5]

In the second embodiment, it is determined in step S2050 for each particle if the divided point of each line segment is occluded. However, it may be determined based on, e.g., the position and orientation information at an immediately preceding time or that of the immediately preceding structure defining level if the divided point of each line segment is occluded, and this occlusion information may be used in step S2050. As a result, a calculation of occlusion information that requires a heavy calculation load can be omitted.

[Modification 2-6]

In the second embodiment, after the particles are updated using line segments with the small structure defining level first, the particles are updated using line segments with the large structure defining level, thus calculating high-precision position and orientation information of the image sensing device 100. However, when the precision of the position and orientation information of the image sensing device 100, which is expressed by the particles updated using the line segments with the small structure defining level is sufficiently high, the process for updating particles using the line segments with the large structure defining level may be omitted. For example, when the maximum one of the weight values of the particles is sufficiently larger than the second largest weight value, or when the average square sum of distances between the corresponding edges and line segments in a particle with the maximum weight value is nearly zero, the processing may be aborted at that timing.

[Modification 2-7]

In the second embodiment, the position and orientation information of the image sensing device 100 is calculated using information obtained from the image sensed by the image sensing device 100. However, using other sensors, the number of unknown values of the position and orientation information having six degrees of freedom may be reduced. For example, the orientation may be given using a three-degrees-of-freedom orientation sensor. Alternatively, a tilt angle having two degrees of freedom may be given using a tilt angle sensor for measuring the tilt angle of the orientation or a three-degrees-of-freedom orientation sensor which can measure the tilt angle with high precision, and four degrees of freedom (the position and azimuth angle of the image sensing device) may be calculated from the image information. Also, only the orientation may be calculated from image information using a position sensor which measures a 3D position using a plurality of objective cameras. Furthermore, using a plurality of those sensors together, the number of unknown values may be reduced.

[Third Embodiment]

The position and orientation measurement apparatus 1 shown in FIG. 1 can be implemented using a general PC (personal computer).

FIG. 12 is a block diagram showing an example of the hardware arrangement of a computer which is applicable to the position and orientation measurement apparatus 1.

A CPU 1201 controls the overall computer using programs (computer programs) and data stored in a RAM 1202 and ROM 1203, and executes respective processes which are described above as those to be implemented by the position and orientation measurement apparatus 1.

The RAM 1202 has an area for temporarily storing programs and data loaded from an external storage device 1206, data externally received via an I/F (interface) 1207, and the like. Furthermore, the RAM 1202 also has a work area used when the CPU 1201 executes various processes. That is, the RAM 1202 can provide various areas as needed.

The ROM 1203 stores setting data, a boot program, and the like of the computer.

An operation unit 1204 includes a keyboard and mouse. When the operator of the computer operates the operation unit 1204, various instructions can be input to the CPU 1201.

A display unit 1205 includes a CRT or liquid crystal display, and can display the processing result of the CPU 1201 by means of images, characters, and the like.

The external storage device 1206 is a large-capacity information storage device represented by a hard disk drive. The external storage device 1206 saves an OS (Operating System), and programs and data for making the CPU 1201 execute respective processes described above as those to be implemented by the position and orientation measurement apparatus 1. These programs include, for example, a program corresponding to the position and orientation calculation unit 130 shown in FIG. 1. Also, these data include various data described above as those to be stored in the model data storage unit 120 shown in FIG. 1. That is, the external storage device 1206 also serves as the model data storage unit 120 shown in FIG. 1.

The programs and data saved in the external storage device 1206 are loaded onto the RAM 1202 as needed under the control of the CPU 1201. The CPU 1201 executes the processes using the loaded programs and data, thereby executing respective processes described above as those to be implemented by the position and orientation measurement apparatus 1.

The I/F 1207 is arranged to connect an external apparatus to the computer, and serves as, for example, the image input unit 110 shown in FIG. 1. Therefore, in this case, an image of the physical space sensed by the image sensing device 100 is output to the external storage device 1206 or RAM 1202 via this I/F 1207.

A bus 1208 interconnects the aforementioned units.

Note that the aforementioned embodiments (including modifications) may be combined as needed. Modifications of the processes and system arrangements required in such case will be easily hit upon for those who are skilled in the art.

[Other Embodiments]

The object of the present invention can be achieved when a computer (or a CPU or MPU) reads out and executes program codes from a storage medium that records the program codes of software that implements the functions of the aforementioned embodiments, and the storage medium that records the program codes constitutes the present invention.

The present invention also includes a case in which the functions of the aforementioned embodiments are implemented when an operating system (OS) or the like executes some or all of actual processes based on instructions of the program codes read out by the computer.

When the present invention is applied to the storage medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-101814 filed Apr. 9, 2008, which is hereby incorporated by reference herein in its entirety.

What is claimed is:

1. An image processing apparatus comprising:
a storage unit configured to store data used to classify line segments of a virtual object corresponding to a physical object into a plurality of groups for which levels are set and to define each of the line segments, where line segments that configure a shape of the virtual object are stored in a group set with a lowest group level;
an image sensing unit configured to sense an image of the physical object;
a selection unit configured to select one group from the plurality of groups one by one, in turn, from the group set with the lowest group level until a group set with a highest group level without any duplication;
a projection unit configured to project line segments which belong to the group selected by said selection unit onto a physical space using the data used to define that line segments, and the image of the physical object; and
an updating unit configured to update position and orientation information indicating a position and orientation of said image sensing unit based on the line segments projected onto the physical space and a feature in the image of the physical object.

2. The apparatus according to claim 1, wherein said updating unit updates position and orientation information indicating an approximate position and orientation of a viewpoint of the image using edges detected from the image and line segments obtained by projecting the line segments which belong to the group selected by said selection unit onto the image.

3. The apparatus according to claim 1, wherein every time said selection unit selects one group, said updating unit updates position and orientation information indicating an approximate position and orientation of a viewpoint of the image using the data used to define line segments which belong to all the groups selected so far by said selection unit, in addition to the data used to define line segments which belong to the selected group and the image.

4. The apparatus according to claim 1, further comprising an output unit configured to output the position and orientation information updated a plurality of times by said updating unit as position and orientation information indicating a final position and orientation of a viewpoint of the image.

5. The apparatus according to claim 4, further comprising a unit configured to interrupt operations of said selection unit and said updating unit when precision of the position and orientation information updated by said updating unit satisfies a predetermined criterion,
wherein when the precision of the position and orientation information updated by said updating unit satisfies the predetermined criterion, said output unit outputs that position and orientation information.

6. The apparatus according to claim 4, wherein when a difference between position and orientation information before updating by said updating unit and position and orientation information after updating by said updating unit is not less than a threshold, said output unit outputs the position and orientation information before updating.

7. A non-transitory computer-readable storage medium storing a computer program for making a computer function as respective units according to claim 1.

8. An image processing apparatus comprising:
a storage unit configured to store data used to classify line segments of a virtual object corresponding to a physical object into a plurality of groups and to define each of the line segments;
an image sensing unit configured to sense an image of the physical object;
a generation unit configured to generate a plurality of types of position and orientation information;
a changing unit configured to randomly change each of the plurality of types of position and orientation information;
a selection unit configured to select one group from the plurality of groups one by one without any duplication;
wherein every time said selection unit selects one group,
a projection unit configured to execute, for each position and orientation information, a process for projecting line segments which belong to the selected group onto the image based on the data used to define the line segments which belong to the selected group and the randomly changed position and orientation information;
a weighting unit configured to calculate a weight value for each position and orientation information based on correspondence between edges detected from the image and the projected line segments; and
a calculation unit configured to calculate a sum total value of results obtained by weighting the respective pieces of position and orientation information by the corresponding weight values as a position and orientation of a viewpoint of the image.

9. A non-transitory computer-readable storage medium storing a computer program for making a computer function as respective units according to claim 8.

10. An image processing method comprising:
a storage step of storing data used to classify line segments of a virtual object corresponding to a physical object into a plurality of groups for which levels are set and to define each of the line segments, where line segments that configure a shape of the virtual object are stored in a group set with a lowest group level;
an image sensing step of sensing an image of the physical object using an image sensing unit;
a selection step of selecting one group from the plurality of groups one by one in turn from the group set with the lowest group level until a group set with a highest group level without any duplication;
a projection step of projecting line segments which belong to the group selected in the selection step onto a physical space using the data used to define that line segments, and the image of the physical object; and
an updating step of updating position and orientation information indicating a position and orientation of the image sensing unit based on the line segments projected onto the physical space and a feature in the image of the physical object.

11. An image processing method comprising:
a storage step of storing data used to classify line segments of a virtual object corresponding to a physical object into a plurality of groups and to define each of the line segments;
an image sensing step of sensing an image of the physical object using an image sensing unit;
a generation step of generating a plurality of types of position and orientation information;
a changing step of randomly changing each of the plurality of types of position and orientation information;
a selection step of selecting one group from the plurality of groups one by one without any duplication;
wherein every time one group is selected in the selection step,
a projection step of executing, for each position and orientation information, a process for projecting line segments which belong to the selected group onto the image based on the data used to define the line segments which belong to the selected group and the randomly changed position and orientation information;

a weighting step of calculating a weight value for each position and orientation information based on correspondence between edges detected from the image and the projected line segments; and a calculation step of calculating a sum total value of results obtained by weighting the respective pieces of position and orientation information by the corresponding weight values as a position and orientation of a viewpoint of the image.

* * * * *